Sept. 8, 1970 SEIICHI KOMURA 3,527,385

TAPE DISPENSING DEVICE

Filed Dec. 21, 1967 6 Sheets-Sheet 1

INVENTOR.
SEIICHI KOMURA
BY
Howard Myles Schwinger
ATTORNEY

INVENTOR.
SEIICHI KOMURA
BY
Howard Myles Schwinger
ATTORNEY

Sept. 8, 1970 SEIICHI KOMURA 3,527,385

TAPE DISPENSING DEVICE

Filed Dec. 21, 1967 6 Sheets-Sheet 3

INVENTOR.
SEIICHI KOMURA
BY
Howard Myles Schwinger
ATTORNEY

INVENTOR.
SEIICHI KOMURA
BY
Howard Myles Schwinger
ATTORNEY

INVENTOR.
SEIICHI KOMURA
BY
Howard Myles Schwinger
ATTORNEY

INVENTOR.
SEIICHI KOMURA
BY
Howard Myles Schwinger
ATTORNEY

United States Patent Office 3,527,385
Patented Sept. 8, 1970

3,527,385
TAPE DISPENSING DEVICE

Seiichi Komura, Osaka, Japan, assignor of one-half to Muto Kogyo Kabushiki Kaisha, Tokyo, Japan
Filed Dec. 21, 1967, Ser. No. 692,359
Claims priority, application Japan, Jan. 14, 1967, 42/2,621
Int. Cl. B26f 3/02
U.S. Cl. 225—24 3 Claims

ABSTRACT OF THE DISCLOSURE

The device includes at least one tape delivery roller having a plurality of transverse lugs on its circumferential surface, and a smaller tape guide roller having a plurality of transverse lugs on its circumferential surface and associated with the tape delivering roller to receive and guide a tape from the tape delivery roller to an outlet opening of the dispensing device. The delivery roller is keyed to the shaft of a manually driven element such as a disc or lever. The top surface of the lug of the delivery roller is positioned to contact with the tip of the tacky rolled tape. The guide roller is designed to have a circumferential speed greater than that of the tape delivery roller so that the tape received from the delivery roller by the lugs of the guide roller is easily separated from the lugs of the delivery roller without manual pull thereof and guided to the outlet opening of the dispensing device. The tape is cut off when a desired length of the tape is delivered out of the outlet opening.

BACKGROUND OF THE INVENTION

This invention relates to a tape dispensing device, especially to means adapted to deliver a cellophane or synthetic tape having one or both surfaces tacky.

One type of conventional tape dispensing device includes a rotatable delivery roller on which a tacky surface of the tape is attached. As the delivery roller is rotated with a leading portion of the rolled tape being attached thereon, the rolled tape is unwound, and the leading edge of the tape will emerge at the opening of the dispenser. Then, the user picks up the leading edge of the tape from the delivery roller, and pulls out the tape a desired length, and cuts off the pulled-out tape from its web by means of a blade suitably secured to the casing of the dispenser. In an operation of this sort, because the tape to be delivered is adhesive, the free end of the web frequently sticks to the surface of the roller and is wound up on the roller as the roller is rotated. To prevent such sticking several arrangements have been provided, one of which is to reduce the contact surface of the roller with the tape by forming a plurality of grooves in the circumferential surface of the roller or by providing a plurality of lugs on the circumferential surface of the roller. Another is to provide an endless conveyor extending between the original delivery roller and an additional roller mounted in the spaced relation to the former for carrying the leading edge of the web on the upper run of the conveyor towards the opening of the dispenser. The former means has been useful for facilitating the removal of the leading edge from the roller in comparison with the original delivery roller without grooves, but requires a careful or continuous observation of the movement of the tape, because otherwise the leading edge of the tape might be wound up around the roller. The latter means has been satisfactory for preventing the leading edge of the tape from winding up around the roller, but the provision of an additional roller for the conveyor will make the size of the dispenser large.

An object of the invention is to provide a tape dispenser which is compact in size, and wherein the leading edge of the tape is positively advanced to an opening of the dispenser without sticking on or being wound up around the delivery roller.

DESCRIPTION OF THE DRAWINGS

Referring now to FIGS. 1 and 2, the tacky tape dispenser TD comprises a casing including a body portion 1 thereof and side cover 30 detachably fitted on the body portion 1 as illustrated in FIG. 1*a*.

Figure 1:
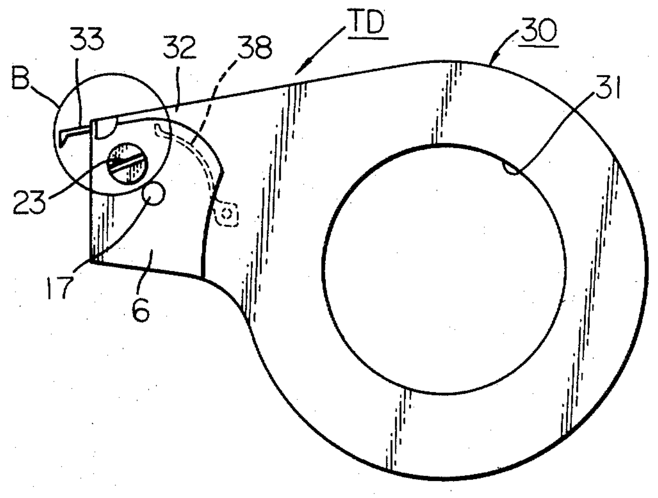
FIG. 1 is a side elevation of the tape dispenser in accordance with the present invention, showing the outline of the dispenser.

The body portion 1 of the casing has a section 2 for receiving a rolled tape 7 and a projected section 3. The rolled tape receiving section 2 includes a circular opening 4 and an annular ring 5 rigidly secured to the periphery of the opening 4 to receive the hollow core of the rolled tape 7. The projected section 3 includes spaced upright side walls 6 adapted to carry a tape delivery roller 8 (feed roll) and a pair of tape guide rollers 13 (stripping rolls) associated with the delivery roller 8.

Figure 3:
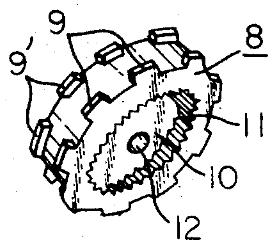
FIG. 3 is a perspective view of the tape delivering roller.

The tape delivering roller 8 includes, as illustrated in FIG. 3, a plurality of lugs 9 and 9' formed in the outer circumferences of flanged portions provided at the opposite ends of the roller 8 respectively, internal teeth 11 and 11' formed in the periphery of each of annular recesses 10 and 10' formed in the flanged portions, and a central bore 12.

Figure 4:
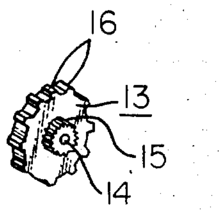
FIG. 4 is a perspective view of the tape guide roller associated with the tape delivery roller of FIG. 3.

The tape guide roller 13 includes, as illustrated in FIG. 4, a plurality of lugs 16 on its outer circumference and external teeth 15 formed in a reduced extension integrally formed with the body of the roller 13, which external teeth 15 are engaged by the internal teeth 11 of the delivery roller 8, and a central bore 14.

It should be noted that the sum of the top areas of the lugs 16 of the guide roller is less than that of the lugs 9 and 9' of the delivery roller 8, and that the outermost diameter of the guide roller 13 is selected to be such that when the delivery and guide rollers 8 and 13 are joined together, the outermost circumference of the guide roller 13 is situated slightly outwardly of that of the delivery roller 8, and to have a circumferential speed greater than that of the delivery roller 8.

Figure 5:
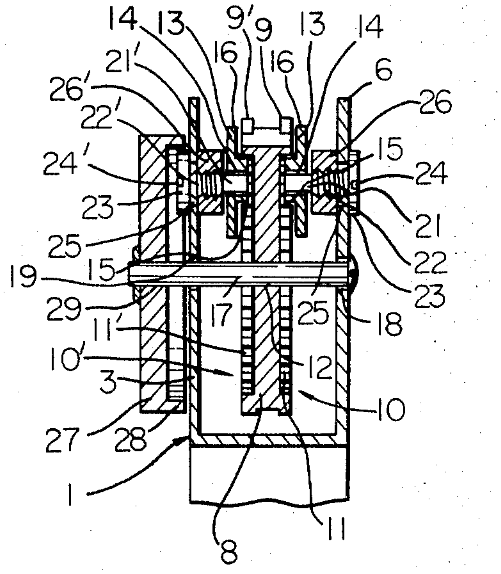
FIG. 5 is a sectional view taken on line A—A of FIG. 2.
Figure 6:
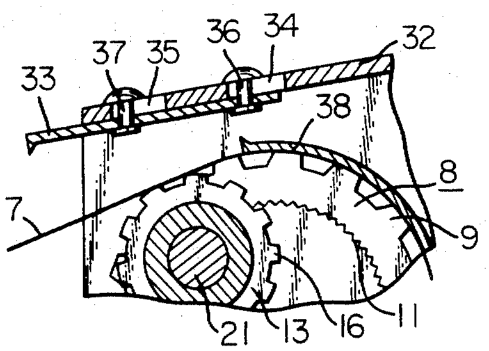
FIG. 6 is an enlarged sectional view of portion B of FIG. 1.

As is illustrated in FIG. 5 the guide rollers 13 and 13' are rotatably mounted on shafts 21 and 21' located adjacent to the outlet opening 20, through which the tape is delivered and above the center of the delivery roller 8, and are connected to the delivery roller 8 by means of the engagement of the external teeth 15, 15 of the guide rollers 13 with the internal teeth 11 and 11' of the delivery roller 8. The shaft 21 has a threaded enlarged portion 22 and a flat head 23 with a groove 24, and inwardly extends through an aperture 25 formed in the upright wall 6 and terminates at the bore 14 of the guide roller 13. By screwing a nut 26 around the threaded portion 22, and pressing the inner face of the head 23 against the upright wall 6, the shaft 21 is rigidly secured to the upright wall 6 of the body casing 1. Similarly to the shaft 21, the shaft 21' has a threaded portion 22' and a flat head 23' with a groove 24' and inwardly extends through an aperture 25 formed in an opposite upright wall 6 and terminates at the bore 14 of the opposite guide roller 13. By means of a nut 26' and threaded portion 22', the shaft 21' is rigidly secured to the opposite upright wall 6.

The delivery roller 8 is rigidly mounted on a shaft 17 at its intermediate position, which shaft extends through and beyond aligned apertures 18 and 19 formed in the opposite upright walls 6 respectively and is rotatably reived therein. Mounted on one end of the shaft 17 is a knob 27 having a peripheral leg 28 enclosing the head 23' of the shaft 21' and a central opening 29 through which the shaft 17 extends and its outer end is rigidly secured thereto.

Figure 1A:
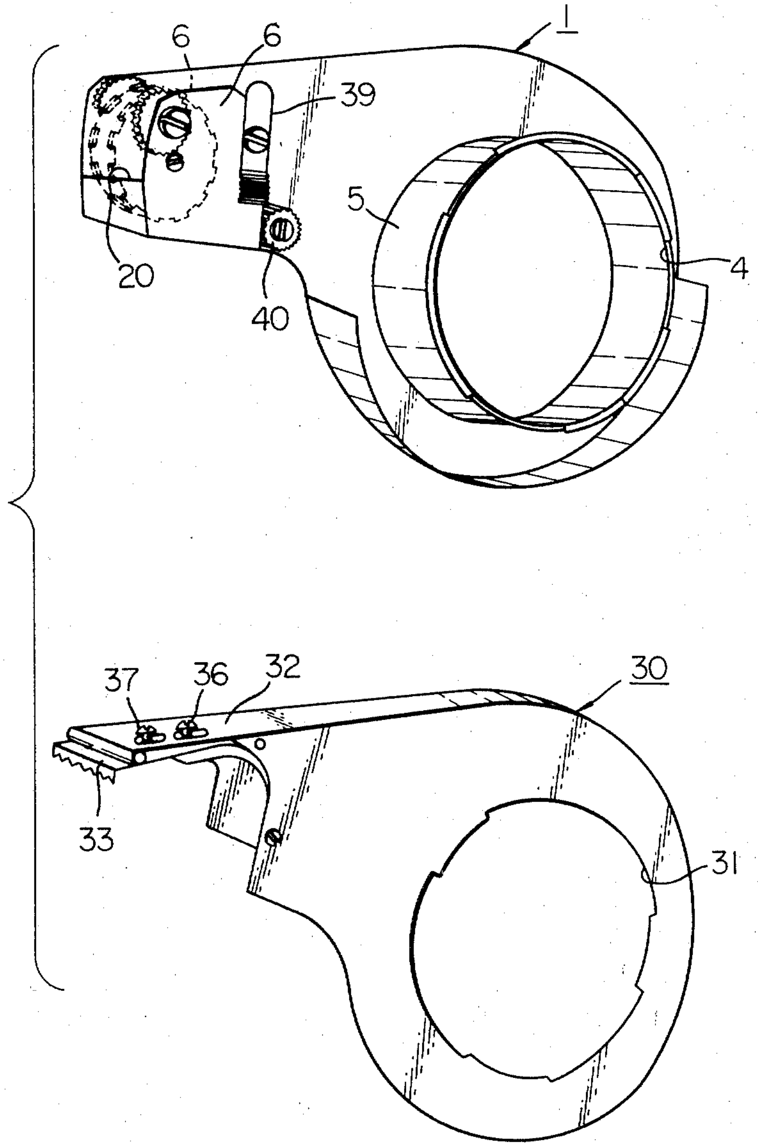
FIG. 1*a* is a perspective view showing the body portion of the casing of the dispenser and a cover portion detachably mounted on the body portion of the casing.

A cover 30 has an opening 31 and an extension 32 as best illustrated in FIG. 1*a*, and is designed to snugly fit the casing body 1, and locked by a spring biased piece 39 illustrated in FIG. 1*a*. The opening 31 is useful for seizing the dispenser by putting the fingers of the user. At the front and on its inner surface of the extension 32 is slidably mounted a blade 33 having a pair of pins 36 and 37 projecting through their corresponding slots 34 and 35 formed in the top wall of the extension 32. The heads of the pins 36 and 37 are rounded to be freely carried on the top wall of the extension 32.

Associated with the delivery roller 8 is an arcuate spring plate 38 to press the tape 7 passing thereagainst the lugs 9 of the delivery roller 8 to make it to stick thereon. The adhesion of the tape on the lugs will prevent the slip of the tape which otherwise might occur in its movement. In case the outer diameter of the delivery roller 8 and the contact area of the lug 9 is large, the spring plate 38 may be omitted. However, the use of the spring plate 38 make the size of the delivery roller 8 smaller because of no slip of the tape on the delivery roller 8.

Figure 2:
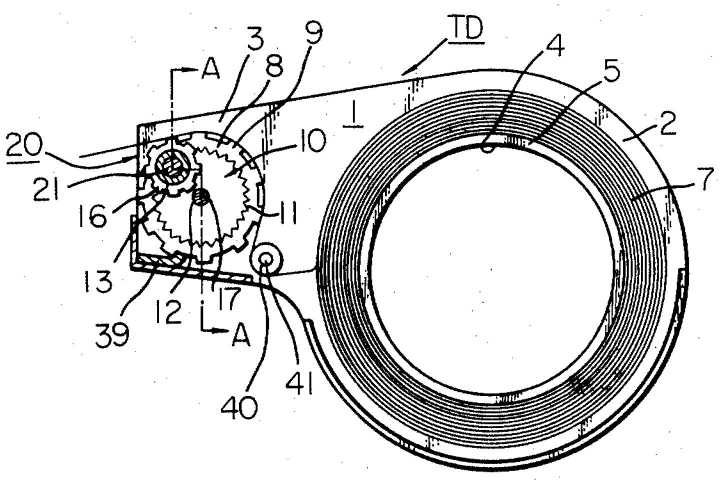
FIG. 2 is a vertical sectional view taken on the longitudinal axis of the dispenser of FIG. 1 and showing the interior thereof.

The web of the tape 7 horizontally extends from a point on the horizontal axis of the rolled tape and turns upward in substance after passing an intermediate roller 40 freely supported on a shaft 41, then runs horizontally in substance after passing the delivery rollers and appears in the opening 20 of the casing, as shown in FIG. 2. To prevent the reverse rotation of the delivery roller 8 there is provided a pawl 38 engageable with the side surface of the lug 9.

In operation, the free end of the tape 7 past the intermediate roller 40 is first adhered to at least one pair of lugs 9 and 9' of the delivery roller 8, and the knob 27 is rotated, then the rotation is transmitted to the delivery roller 8 through the shaft 17 because of both knob 27 and delivery roller 8 being fixed on the shaft 17, and the delivery roller 8 is rotated. As the delivery roller 8 is rotated, the tape 7 is successively delivered from its roll to the guide rollers 13, and simultaneously the guide rollers 13 are rotated because of the outer teeth 15 of the guide rollers 13 being engaged by the inner teeth 11 of the delivery roller 8. The delivered tape 7 is immediately adhered to the top surfaces of the lugs 16 of the rotating guide rollers 13. As is described hereinbefore, since each guide roller 13 has a circumferential speed greater than that of the delivery roller 8, at the moment the leading portion of the tape 7 is stuck to the guide rollers 13. the portion of the tape 7 between the delivery and guide rollers 8 and 13 is suddenly stretched. In addition to the stretch action, since the adhesive area of the guide rollers 13 is smaller than that of the delivery roller 8, the leading edge of the tape on the lug 16 of the guide roller 13 is separated therefrom, and is automatically advanced through the opening 20 to the blade 33. When the tape 7 is delivered from the opening 20 by a desired length, the tape is cut off from its web by the blade 33.

Figure 7:
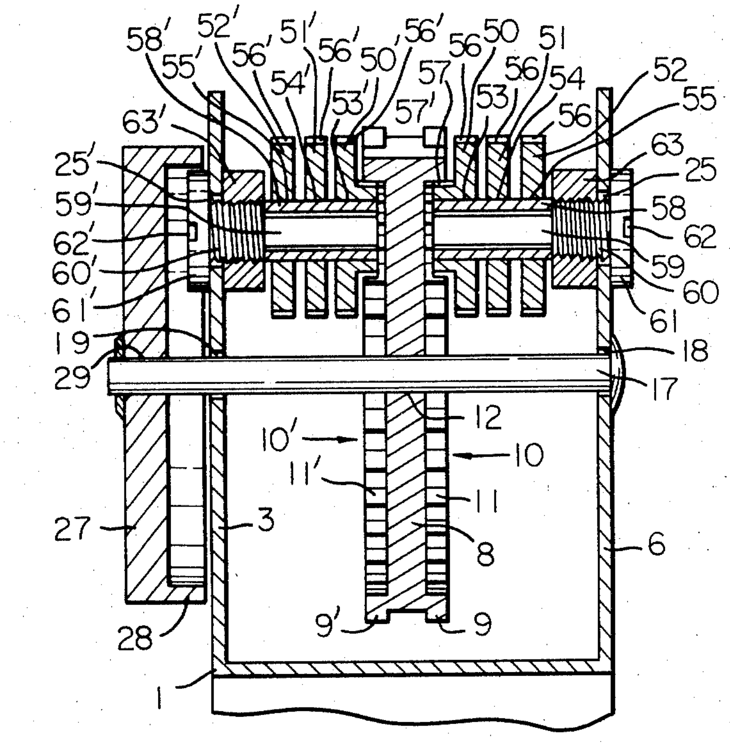
FIG. 7 is a modification of the tape delivery roller of FIG. 3, shown in similar to FIG. 5.

FIG. 7 shows a modification of the dispenser illustrated in FIGS. 1 to 6 wherein a pair of multiple guide rollers is used for a pair of single guide rollers 16 illustrated in FIGS. 1 to 6, but the other parts are similar to those of FIGS. 1 to 6. One multiple guide roller includes a set of guide rollers 50, 51 and 52 and other includes a set of guide rollers 50', 51' and 52'. The guide rollers 50, 51 and 52 have central bores 53, 54 and 55 aligned each other. The guide rollers 50' 51' and 52' have respectively central bores 53', 54' and 55'. Each of the guide rollers 50, 51 and 52 and each of guide rollers 50', 51' and 52' include respectively a plurality of lugs 6 and 56' formed in their respective outer circumferences. The innermost positioned guide rollers 50 and 50' have respectively inwardly extending reduced extensions with external teeth 57 and 57' which are engaged by the internal teeth 11 and 11' respectively.

The guide rollers 50, 51 and 52 are rigidly secured to a common sleeve 58 passing through the center bores 53, 54 and 55 for unitary movement. The guide rollers 50', 51' and 52' are similarly constructed to the guide rollers 50, 51 and 52. Each outermost diameter of the guide rollers 50, 51 and 52 and each outermost diameter of the guide rollers 50', 51' and 52' are selected to be such that when the guide rollers 50 or 50' is joined to the delivery roller 8 by engagement of the outer teeth 57 and the inner teeth 11 or the external teeth 57' and internal teeth 11', the outermost circumference of each guide roller is situated slightly outwardly of that of the delivery roller 8, and to have a circumferential speed greater than that of the delivery roller 8 in similar to the guide roller 13.

As is illustrated in FIG. 7, the sets of guide rollers 50, 51, 52 including the sleeve 58 and guide rollers 50', 51', 52' including the sleeve 58' are rotatably mounted on shafts 59 and 59' located adjacent to the outlet opening 20 and above the center of the delivery roller 8 respectively, and are connected to the delivery roller 8 by means of the engagement of the external teeth 11 and 11' of the innermost guide rollers 50 and 50' and the external teeth 57 and 57' respectively. The shaft 59 has a threaded enlarged portion 60 and a flat head 61 with a groove 62 and inwardly extends through an aperture 25 in the upright wall 6 and the sleeve 58 and terminates at its inner end. By screwing a nut 63 around the threaded portion 60, which nut being previously mounted thereon, and urging the inner face of the head 61 against the upright wall 6, the shaft 59 is rigidly secured to the upright wall 6 of the body casing 1. Similar to shaft 59, the shaft 59' has a threaded portion 60' and a flat head 61' with a groove 62' and inwardly extends through an aperture 25' in an opposite upright wall 6 and the sleeve 58' and terminates at its inner end. By means of a nut 63' and threaded portion 60', the shaft 59' is rigidly secured to the opposite upright wall 6.

The delivery roller 8 is rigidly mounted on the shaft 17 at its intermediate position, which shaft extends through and beyond apertures 18 and 29 in the opposite walls 6 respectively and is rotatably received therein. Mounted on one end of the shaft 17 is a knob 27 having a peripheral leg 28 enclosing the head 61′ of the shaft 59′ and a central opening 29 through which the shaft 17 extends and its outer end is rigidly secured thereto. The delivery of the tape 7 is performed in similar to the case of FIGS. 1 to 6, namely, the free end of the tape 7 past the intermediate roller 40 is first adhered to at least one pair of lugs 9 and 9′ of the delivery roller 8, and the knob 27 is rotated, then the delivery roller 8 is rotated. Upon the rotation of the delivery roller 8, the set of guide rollers 50, 51 and 52 and the other set of guide rollers 50′, 51′ and 52′ are rotated because of the external teeth 57 and 57′ of the guide rollers 50 and 50′ being engaged by the internal teeth 11 and 11′ of the delivery roller 8. Because of both differences in peripheral speed and adhesive area between the delivery roller 8 and the sets of guide rollers 50, 51, 52 and 50′, 51′, 52′, the tape 7 is separated or stripped from the multiple guide rollers 50, 51, 52 and 50′, 1′, 2′. This type of the guide roller is adapted for delivering a wide tape and facilitating its separation from the guide roller.

Figure 8:
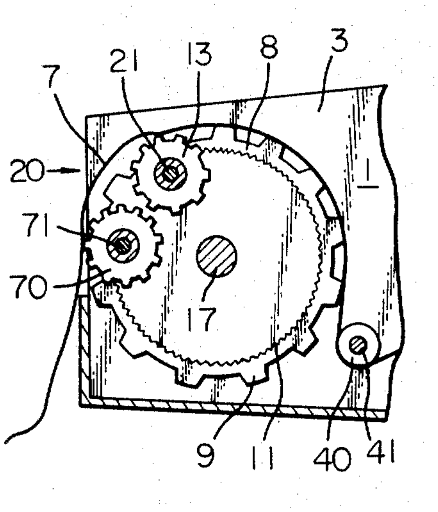
FIG. 8 shows another modification of the tape delivery roller.

FIG. 8 shows another modification wherein auxiliary rollers 70 similar to the guide rollers 13 of FIGS. 1 to 6 are additionally provided at a position under and in front of the guide rollers 13, but other parts are similar to those of FIGS. 1 to 6. The auxiliary rollers 70 are rotatably supported on their corresponding shafts 71. The purpose of the auxiliary rollers 70 will be presently explained.

In general, if the free end of the tape is relatively long it will hang down from the guide rollers 13 as shown in FIG. 8, and might stick again on the guide rollers 13 and be wound up around them, or might stick on the casing of the dispenser. However, such a disadvantage may be obviated by providing the auxiliary rollers 70, because even if the free end of the tape 7 sticks to the auxiliary rollers 70, the former is positively separated from the latter by function of the latter similar to the guide rollers 13.

Figure 9:
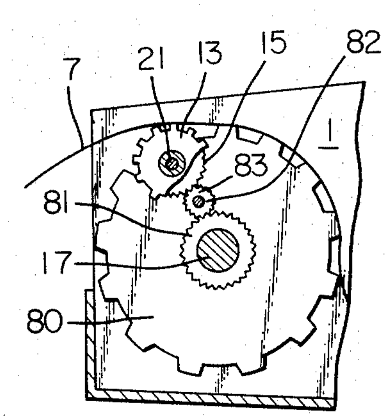
FIG. 9 shows a modification of the tape guide roller of FIG. 4.

FIG. 9 shows another modification wherein means for driving the guide rollers 13 differs from that illustrated in FIGS. 1 to 6, and other parts are similar to that of FIGS. 1 to 6. Namely, while the driving of the guide rollers 13 in the original arrangement is effected by engagement of the internal teeth 11 of the delivery roller 8 and the external teeth 15 of the guide rollers 13, in the present modification it is effected by arranging a pinion 81 to engage with the external teeth 15 of the guide rollers 13 and the external teeth 81 formed in the circumference of a reduced extension of the delivery roller 80, the pinion 81 being rotatably supported on a shaft 83 secured to the opposite upright side walls 6. As is the same as in the original arrangement, the guide rollers 80 have a peripheral speed greater than that of the delivery roller 80, and the adhesive area less than that of the delivery roller 80. It will be understood that the guide rollers 13 originally provided with the lugs 16 and the reduced extension with the external teeth 15 of the guide rollers 13 and the external teeth 81 formed in the circumference of a reduced extension of the delivery roller 80, the pinion 81 being rotatably supported on a shaft 83 secured to the opposite upright side walls 6. As is the same as in the original arrangement, the guide rollers 80 have a peripheral speed greater than that of the delivery roller 80, and the adhesive area less than that of the delivery roller 80. It will be understood that the guide rollers 13 originally provided with the lugs 16 and the reduced extension with the external teeth 15 may be replaced by a flat gear whose external teeth is engaged by the teeth of the pinion.

Figure 10:
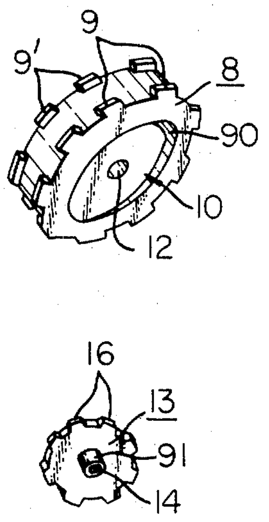
FIG. 10 is a perspective view showing separately the tape delivery and guide rollers shown in FIG. 5.

FIG. 10 shows further modification of the driving of the guide rollers 13 wherein the delivery roller 8 includes a cylindrical internal friction face 90 formed on each of the cylindrical wall of the recesses 10, and each guide roller 13 also includes a cylindrical external friction face 91 formed on the periphery of a reduced extension of the guide roller 13. By arranging the delivery and guide rollers 8 and 13 to make their corresponding friction faces 90 and 91 to engage each other, the guide rollers 13 are driven by the rotation of the delivery roller 8.

The advantage of driving of this type is to may omit tooth cutting operations consequently may reduce the cost of the dispenser. It will be evident that this type of driving may be applied to the guide rollers 13 as illustrated in FIGS. 7, 8 and 9.

Figure 11:
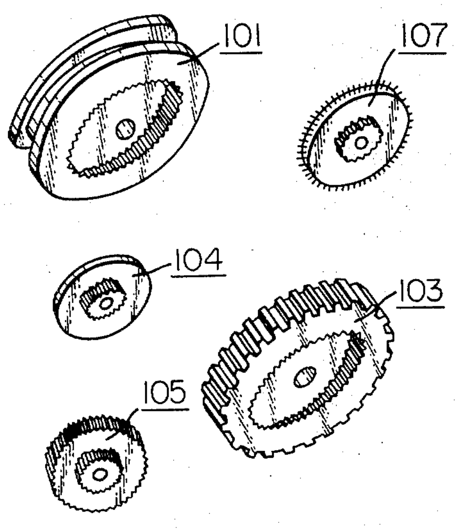
FIG. 11 is a perspective view showing separately another type of the tape delivery and guide rollers.
Figure 12:
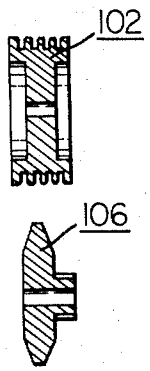
FIG. 12 shows the sectional views of a further type of the tape delivery and guide rollers.

FIGS. 11 and 12 show several types of the delivery and guide rollers wherein a delivery roller designated by numeral 101 includes a circumferentially extending groove instead of the spaced lugs 9 and 9′; a delivery roller 102 includes a plurality of circumferential grooves; a delivery roller 103 includes a plurality of transversely extending grooves or teeth; a guide roller 104 includes a flattened peripheral surface; a guide roller 105 includes a plurality of transverse lugs or grooves; a guide roller 106 includes a wedge-like peripheral edge; a guide roller 107 includes a peripheral surface into which a plurality of pins are mounted.

Figure 13:
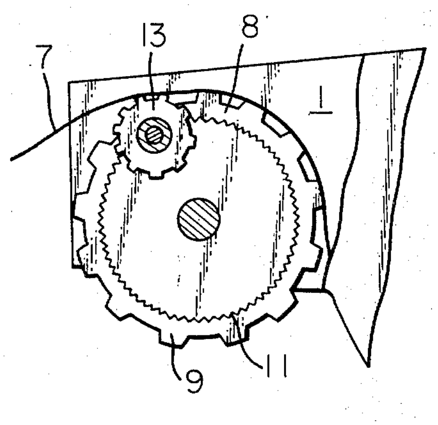
FIG. 13 shows another way to drive the tape delivery roller.

In the explanation made hitherto, the knob 27 was used for delivering the tape 7, but the delivering of the tape may be accomplished in such a manner that the lower portion of the projected section 3 of the body casing 1 is cut off to the extent in which some lower portion of the delivery roller 8 may directly be accessible to the thumb of the user for rotation thereof, as shown in FIG. 13.

Figure 14:
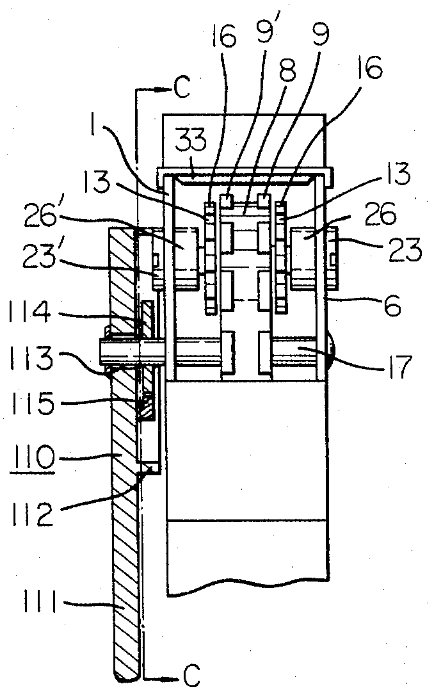
FIG. 14 shows in section a way to drive the tape delivery roller by employing a ratchet wheel and pawl.
Figure 15:
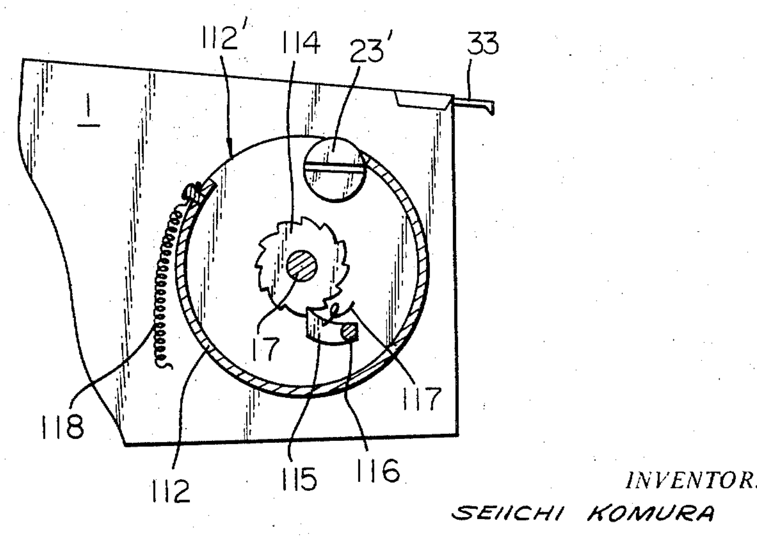
FIG. 15 is an elevational view of the means shown in FIG. 14 taken on line C—C thereof.

Additionally, lever and ratchet wheel-pawl means as illustrated in FIGS. 14 and 15 may be substituted for the knob means. Referring to FIGS. 14 and 15, a drive lever 110 comprises a handle portion 110 and an annular lug or extension 112 provided with a cut-off portion 112′ as best shown in FIG. 15, the annular extension 112 being preferably formed integrally with the lever 110. The lever 110 has a bore 113 to freely receive the outer end of the shaft 17, consequently the drive lever 110 is rotatably mounted on the shaft 17, while the delivery roller 8 is keyed thereto.

The head 23′ of the shaft 21′, to which shaft 21′ the guide roller 9′ being keyed, is positioned to intersect the arcuate cut-off portion 112 as best shown in FIG. 15, and serves as a stop to a rocking movement of the lever 110 about the shaft 17, in other words, the range of the rotation of the lever 110 corresponds to the length of the arcuate cut-off portion 112. A ratchet wheel 114 is rigidly mounted on the shaft 17 as well as the delivery roller 8, and enclosed by the annular lug 112. A pawl 115 for driving the ratchet wheel 114 is mounted on the inner surface of the lever 111 enclosed by the annular lug 112 by means of a pin 116 and spring 117. The pin 116 is rigidly secured to the lever 111 and rotatably support the pawl 115, and the spring 116 is anchored at its one end to the lever 111 and at other end connected to the pawl 115. The lever 111 is biased by a coil spring 118 anchored to the lever 111.

In operation, when the lever 110 is rotated, the pawl 115 secured to the lever 110 drives the ratchet wheel 114 that in turn rotates the delivery wheel 8 through the shaft 17. The rotation of delivery wheel 8 drives the guide rollers 13. With the movement of these members, the tape 7 appears in or out of the opening 20 of the dispenser. In delivering the tape, since the rotation of the lever 110 is limited to the extent proportional to the length of the cut-off portion 112′, a constant length of the tape is delivered in every cycle of the rotation of the lever 110. By providing the spring 118, the lever 110 may be automatically returned to its original position when the lever 110 is released from the force applied thereto for rotation, for example, by the finger of the user, because in the tape delivering rotation of the lever 110 the spring 118 is stretched and an energy is stored therein. On the other hand, the reverse rotation of the ratchet wheel 114 is always prevented by the pawl 115 biased by the spring 117. On the other hand, if the return movement of the lever 110 is manually done by the finger of the user, the spring 118 may be omitted.

Several types of modifications of the tape dispensers have been explained, but the gist of the invention lies in the construction wherein the guide roller has a diameter less than, a circumferential speed greater than and a tape adhering area less than those of the delivery roller, and the outermost circumference of the guide roller is situated slightly outwardly of that of the delivery roller.

According to the dispenser of the invention, the strip or separation and delivery of the tape can be carried out without chance of rewinding the tape in the mechanism has been often experienced with conventional dispensers, and the tape may be easily cut in a desired length; furthermore, since the guide roller is positioned substantially inside of the delivery roller, means such as a tape conveyor is not required, and the omission of such means makes the dispenser compact, consequently more portable, and simple in construction.

What I claim is:

1. A mechanism for dispensing pressure-sensitive tape comprising a frame, means thereon for rotatably supporting a supply roll of tape, a feed roll rotatably mounted on the frame to which the tacky side of the tape from the supply roll is adapted to adhere, a pair of smaller stripping rolls rotatably inter-connected to the larger feed roll, one roll on either side thereof, the axes of rotation of the stripping rolls being within the circumference of the feed roll, the stripping rolls having a peripheral speed greater than that of the feed roll and an adhesive area less than that of the feed roll, and means for cutting the tape delivered by the stripping rolls.

2. A mechanism in accordance with claim 1 wherein said feed roll has a toothed recess formed in each of its sides, and each stripping roll is provided with teeth for meshing with the feed roll.

3. A mechanism in accordance with claim 1 wherein said rolls are provided on their edge with a plurality of lugs against which the tape is adhered.

References Cited

UNITED STATES PATENTS

| | | | |
|---|---|---|---|
| 1,972,851 | 9/1934 | McCarthy | 226—96 |
| 2,233,361 | 2/1941 | Anderson et al | 225—24 X |
| 2,647,745 | 8/1953 | Erhardt | 226—96 |
| 2,710,063 | 6/1955 | Krueger | 225—24 X |
| 2,725,938 | 12/1955 | Krueger | 225—24 X |
| 2,760,572 | 8/1956 | Krueger | 225—24 X |

FOREIGN PATENTS

| | | |
|---|---|---|
| 717,954 | 11/1954 | Great Britain. |

FRANK T. YOST, Primary Examiner

U.S. Cl. X.R.

226—96